(12) United States Patent
Homma et al.

(10) Patent No.: US 8,629,845 B2
(45) Date of Patent: Jan. 14, 2014

(54) INFORMATION PROCESSING APPARATUS AND INFORMATION PROCESSING METHOD

(75) Inventors: Fuminori Homma, Tokyo (JP); Tatsushi Nashida, Kanagawa (JP)

(73) Assignee: Sony Corporation, Tokyo (JP)

( * ) Notice: Subject to any disclaimer, the term of this patent is extended or adjusted under 35 U.S.C. 154(b) by 210 days.

(21) Appl. No.: 12/770,248

(22) Filed: Apr. 29, 2010

(65) Prior Publication Data

US 2010/0283758 A1   Nov. 11, 2010

(30) Foreign Application Priority Data

May 11, 2009   (JP) ................................ P2009-114195

(51) Int. Cl.
*G06F 3/041*   (2006.01)

(52) U.S. Cl.
USPC ............ 345/173; 345/174; 715/863; 715/864

(58) Field of Classification Search
USPC ............ 345/173–179, 624; 178/18.01–20.04, 178/18.01–20.03; 310/338–339
See application file for complete search history.

(56) References Cited

U.S. PATENT DOCUMENTS

| | | | | |
|---|---|---|---|---|
| 5,594,844 A * | 1/1997 | Sakai et al. | ................... | 345/427 |
| 5,784,061 A * | 7/1998 | Moran et al. | ................... | 715/863 |
| 5,815,151 A * | 9/1998 | Argiolas | ........................ | 715/800 |
| 5,844,547 A * | 12/1998 | Minakuchi et al. | ........... | 345/173 |
| 5,861,886 A * | 1/1999 | Moran et al. | ................... | 715/863 |
| 6,958,749 B1 * | 10/2005 | Matsushita et al. | ........... | 345/175 |
| 7,221,357 B2 * | 5/2007 | Von Essen et al. | ............. | 345/173 |
| 7,239,305 B1 * | 7/2007 | Nakano et al. | ................. | 345/179 |
| 7,345,675 B1 * | 3/2008 | Minakuchi et al. | ........... | 345/173 |
| 7,557,800 B2 * | 7/2009 | Yanagisawa | ..................... | 345/173 |
| 7,651,396 B2 * | 1/2010 | Takahashi | ........................ | 463/30 |
| 7,853,873 B2 * | 12/2010 | Gotoh et al. | ................... | 715/246 |
| 7,969,412 B2 * | 6/2011 | Nagiyama et al. | ............. | 345/156 |
| 8,042,044 B2 * | 10/2011 | Van Leeuwen | ................ | 715/702 |
| 2002/0089492 A1 * | 7/2002 | Ahn et al. | ....................... | 345/173 |
| 2004/0207606 A1 * | 10/2004 | Atwood et al. | ................ | 345/173 |
| 2006/0132460 A1 * | 6/2006 | Kolmykov-Zotov et al. | . . | 345/173 |
| 2006/0170678 A1 * | 8/2006 | Ahn et al. | ....................... | 345/423 |
| 2006/0244735 A1 * | 11/2006 | Wilson | ........................... | 345/173 |
| 2007/0008300 A1 * | 1/2007 | Yang et al. | ..................... | 345/173 |
| 2007/0250768 A1 * | 10/2007 | Funakami et al. | ............. | 715/521 |
| 2007/0250786 A1 * | 10/2007 | Jeon et al. | ....................... | 715/765 |
| 2008/0042978 A1 * | 2/2008 | Perez-Noguera | ............. | 345/168 |
| 2008/0049020 A1 * | 2/2008 | Gusler et al. | ................... | 345/427 |
| 2008/0231608 A1 * | 9/2008 | Nagata | ........................... | 345/173 |
| 2008/0256439 A1 * | 10/2008 | Boreham et al. | .............. | 715/246 |
| 2009/0002326 A1 * | 1/2009 | Pihlaja | ........................... | 345/173 |
| 2009/0184935 A1 * | 7/2009 | Kim | ................................ | 345/173 |

(Continued)

FOREIGN PATENT DOCUMENTS

JP    05-100809    4/1993

*Primary Examiner* — Alexander Eisen
*Assistant Examiner* — Sanjiv D Patel
(74) *Attorney, Agent, or Firm* — Sherr & Jiang, PLLC

(57) ABSTRACT

An information processing apparatus includes: display means for displaying an image including an object; detection means, which is stacked on the display means, for detecting a contact with the display means; and control means for switching an operation mode of the display means based on a ratio of the area of the object displayed in the display means to the area of a region of the display means in which the contact is detected by the detection means.

16 Claims, 12 Drawing Sheets

(56) References Cited

U.S. PATENT DOCUMENTS

| | | | |
|---|---|---|---|
| 2009/0184939 A1* | 7/2009 | Wohlstadter et al. | 345/173 |
| 2009/0289911 A1* | 11/2009 | Nagai | 345/173 |
| 2010/0039449 A1* | 2/2010 | Jin | 345/666 |
| 2010/0085318 A1* | 4/2010 | Lee et al. | 345/173 |
| 2010/0090964 A1* | 4/2010 | Soo et al. | 345/173 |
| 2011/0012856 A1* | 1/2011 | Maxwell et al. | 345/173 |

\* cited by examiner

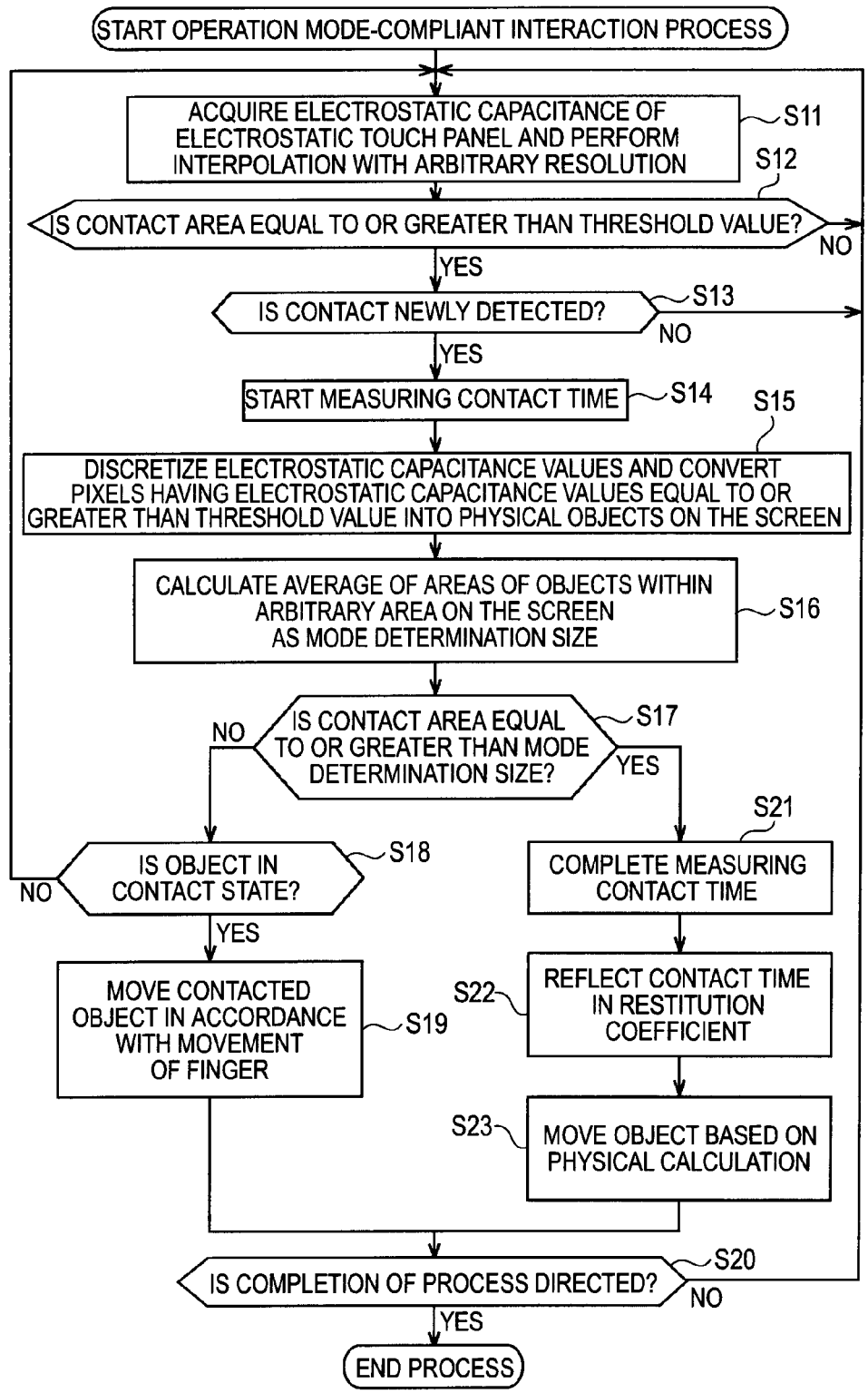

INFORMATION PROCESSING APPARATUS AND INFORMATION PROCESSING METHOD

BACKGROUND OF THE INVENTION

1. Field of the Invention

The present invention relates to an information processing apparatus and an information processing method, and more particularly, to an information processing apparatus and an information processing method capable of operating a small object on a touch panel directly and naturally.

2. Description of the Related Art

Recently, in mobile terminal apparatuses, a high-definition display screen is mounted in accordance with improvement of the screen resolution of displays.

As a result, image display same as in general floor-standing type apparatuses can be implemented in recently-developed mobile terminal apparatuses.

For example, a thumbnail image of 64×64 pixels is displayed in the size of about 10 mm$^2$ on a display screen of a general floor-standing type apparatus. On the other hand, on a high-definition display screen of a recently-developed mobile terminal apparatus, a thumbnail image is displayed in a smaller size (for example, in the size of about 4 mm$^2$).

In addition, the number of pixels configuring the thumbnail image on the high-definition display screen is not changed from that of a general apparatus. For example, in the above-described example, a thumbnail image of 64×64 pixels is displayed on the high-definition display screen. Accordingly, in recently-developed mobile terminal apparatuses in which the high-definition display screen is mounted, the bird's eye view can be improved by simultaneously disposing many thumbnail images on the screen without degrading the visibility. The improvement of the bird's eye view is a requirement that may be particularly needed for a mobile terminal apparatus having a physically small screen area.

Meanwhile, as an operation for an object displayed on a touch panel of a mobile terminal apparatus, a direct operation performed by using a finger can be implemented (for example, see JP-A-5-100809).

SUMMARY OF THE INVENTION

However, even in a case where display of objects can be decreased in size within a range not degrading the visibility by mounting a high-definition display screen, it is difficult to decrease the area of a user's finger. Accordingly, it is difficult to directly operate an object, for example, displayed in the size of about 4 mm$^2$ on a touch panel by using a finger.

In JP-A-5-100809, a technique for moving an object based on the movement of a finger has been disclosed. However, even in a case where a plurality of objects significantly smaller than the contact area of a finger are displayed, only an operation according to the movement of the finger in one direction can be implemented by only applying the above-described technique. By performing such an operation, it is difficult to move all the objects in a natural manner.

Thus, there is a need for directly operating a small object on a touch panel in a natural manner.

According to an embodiment of the present invention, there is provided an information processing apparatus including: display means for displaying an image including an object; detection means, which is stacked on the display means, for detecting a contact with the display means; and a control means for switching an operation mode of the display means based on a ratio of the area of the object displayed in the display means to the area of a region of the display means in which the contact is detected by the detection means.

In the above-described information processing apparatus, it may be configured that an operation of moving a contact object by a predetermined distance in a predetermined direction with the contact object being brought into contact with the display means is a trace operation, as the operation modes, there are a first mode, in which the object brought into contact with a finger out of the objects displayed in the display means is moved along the trajectory of the finger according to the trace operation as a process for the trace operation, and a second mode, in which one or more of the objects displayed in the display means are moved to be collected along the trajectory of the finger according to the trace operation as a process for the trace operation, and the control means switches the operation mode to the first mode in a case where the ratio is equal to or greater than a predetermined value, and switches the operation mode to the second mode in a case where the ratio is smaller than the predetermined value.

In addition, the control means may also control the performance of a process corresponding to the switched mode of the first mode and the second mode.

In addition, the control means may control the performance of the process by using a result calculated by a physical engine in a case where switching to the second mode is performed.

In addition, the control means may be configured to calculate the ratio by using an average value of areas of a plurality of target objects or a processed value thereof as the area of the object in a case where there are the plurality of target objects to be operated out of the objects displayed in the display means.

According to another embodiment of the present invention, there is provided an information processing method corresponding to the information processing apparatus according to the above-described embodiment of the present invention.

According to the information processing apparatus and the information processing method of the embodiments of the present invention, an image including an object is displayed, a contact for the display is detected, and the operation mode is switched based on the ratio of the area of the displayed object to the area of a region in which the contact is detected.

According to the embodiments of the present invention, a small object on a touch panel can be directly operated in a natural manner.

BRIEF DESCRIPTION OF THE DRAWINGS

FIG. 8 is a flowchart illustrating an example of an operation mode-compliant interaction process of the mobile terminal apparatus shown in FIG. 2.

DESCRIPTION OF THE PREFERRED EMBODIMENTS

General Operation

First, before an embodiment of the present invention is described, an overview of a general operation of an image on a touch panel will be described for easy understanding of the embodiment of the invention.

Figure 1A:
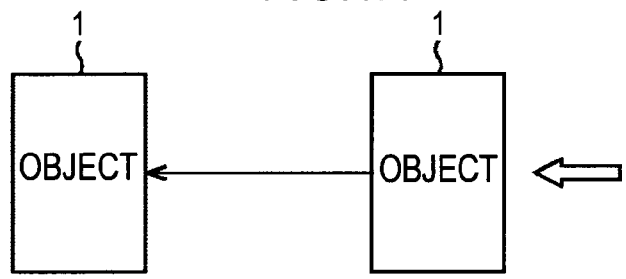
FIGS. 1A to 1C are diagrams illustrating an operation on a general touch panel by using a finger.
Figure 1B:
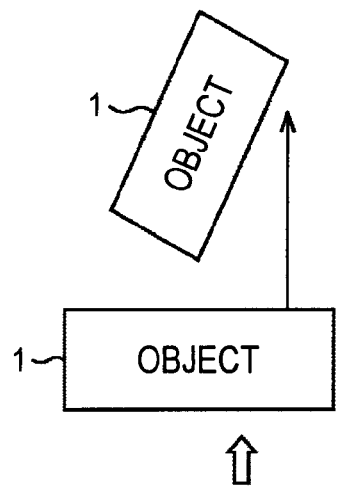
Figure 1C:
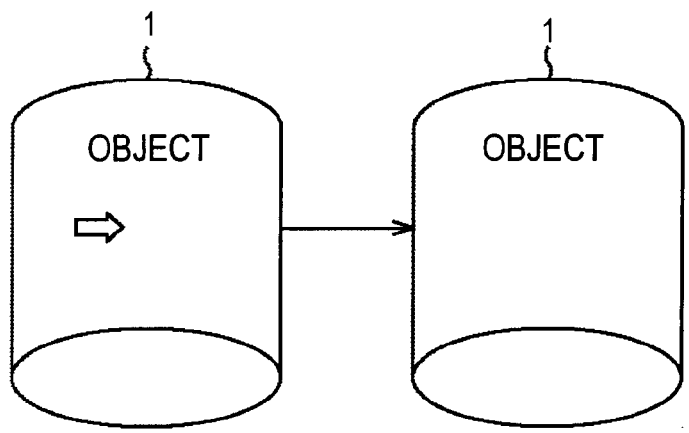

FIGS. 1A to 1C are diagrams illustrating an operation on a general touch panel by using a finger, which is disclosed in JP-A-5-100809.

For example, a state in which an object 1 shown on the right side in FIG. 1A is displayed is assumed to be the initial state. In the initial state, when a position denoted by a white arrow located to the right side of the object 1 is touched by a finger as a user's operation, the movement speed of the object 1 is determined based on the movement speed of the finger on the touch panel. Then, the display state of the touch panel transits from the initial state to a state in which the object 1 shown on the left side in FIG. 1A is displayed. In other words, the display of the object 1 is moved in the direction in which the finger is moved. In such a case, the movement of the object 1 becomes inertial migration having the movement speed of the finger as its initial speed.

For example, a state in which the object 1 shown in the lower portion of FIG. 1B is displayed is assumed to be the initial state. In the initial state, a position denoted by a white arrow shown on the lower side of the object 1 is assumed to be touched by the finger. The position denoted by the white arrow is a position deflected from the center of a predetermined side of the object 1. In such a case, the object 1 is rotated by a predetermined angle about the position touched by the finger, and the display state of the touch panel transits from the initial state to a state in which the object 1 shown on the upper side of FIG. 1B is displayed. In other words, the object 1 is moved in the direction in which the finger moves.

For example, a state in which the object 1 shown on the left side of FIG. 1C is assumed to be the initial state. In the initial state, a position denoted by a white arrow on the object 1 is assumed to be touched by the finger. In such a case, the display state of the touch panel transits from the initial state to a state in which the object 1 shown on the right side of FIG. 1C is displayed. In other words, the object 1 is moved in the movement direction of the finger.

As described above, in the general operation on a touch panel, the object is moved based on the movement of the finger that is made in one direction. However, in a case where there is a plurality of objects, which are much smaller than a contact area of the finger, it is difficult to naturally move all the objects based only on the movement of the finger that is made in one direction. Thus, in order to naturally move the object based only on the movement of the finger that is made in one direction, for example, a method in which the objects are enlarged so as to be displayed up to a size that can be handled by the finger may be considered. However, such a method is not appropriate. The reason is that switching between an operation-oriented display (display of an enlarged object) and a bird's-eye view-oriented display (reduced display in which small objects are maintained to be displayed) leads to degradation of operability and visibility.

Thus, the inventor of the present invention has developed a technique for allowing a user to perform an intuitive operation of "collecting" the objects located on the touch panel and moving the objects in accordance with the operation. By applying such a technique, even in a case where there are a plurality of objects much smaller than the contact area of a finger on the touch panel, the objects can be moved directly and naturally for the user.

Hereinafter, an information processing apparatus to which such a technique is applied, that is, a mobile terminal apparatus as an information processing apparatus according to an embodiment of the present invention will be described.

External Configuration Example of Mobile Terminal Apparatus

Figure 2:
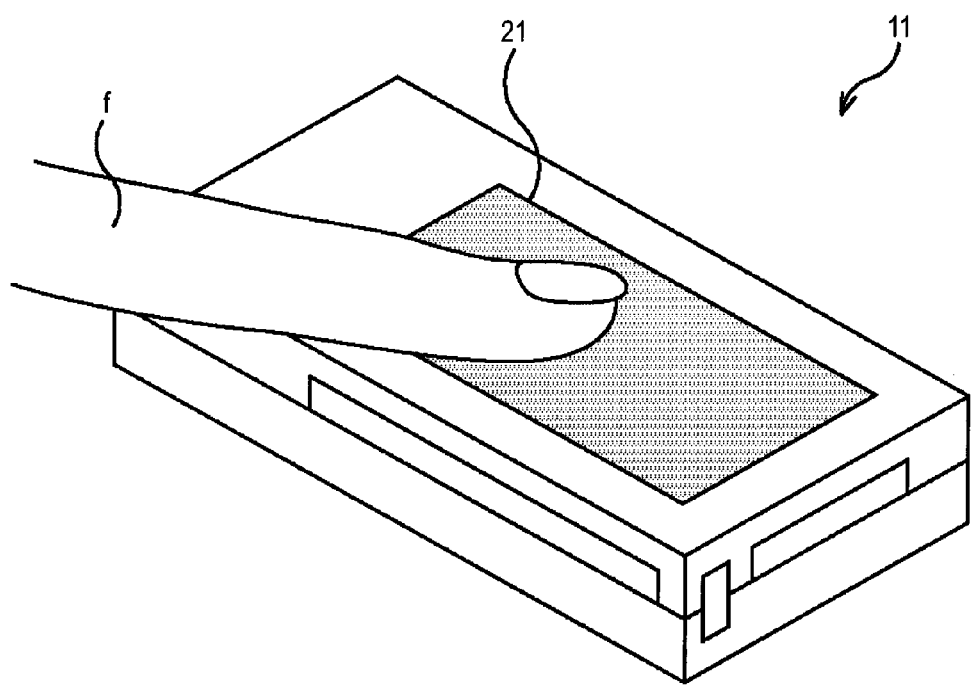
FIG. 2 is a perspective view showing an external configuration example of a mobile terminal apparatus as an information processing apparatus according to an embodiment of the present invention.

FIG. 2 is a perspective view showing an external configuration example of a mobile terminal apparatus as an information processing apparatus according to an embodiment of the present invention.

On a predetermined face of the mobile terminal apparatus 11, an electrostatic touch panel 21 is disposed. The electrostatic touch panel 21 is configured by stacking an electrostatic touch sensor 21-S for a touch panel, to be described later, shown in FIG. 4 on a display unit 21-D, to be described later, shown in FIG. 4. When a user's finger f or the like is brought into contact with the screen of the display unit 21-D of the electrostatic touch panel 21, the contact is detected in the form of a change in the electrostatic capacitance of the electrostatic touch sensor 21-S for a touch panel. Then, a transition (temporal transition) of the coordinates of the contact position of the finger f that is detected by the electrostatic touch sensor 21-S for a touch panel and the like are recognized by a CPU 22, to be described later, shown in FIG. 4. The content of the operation is detected based on the result of the recognition. A concrete example of the operation and the detection technique thereof will be described later.

Detection of Contact Using Electrostatic Touch Sensor

Figure 3:
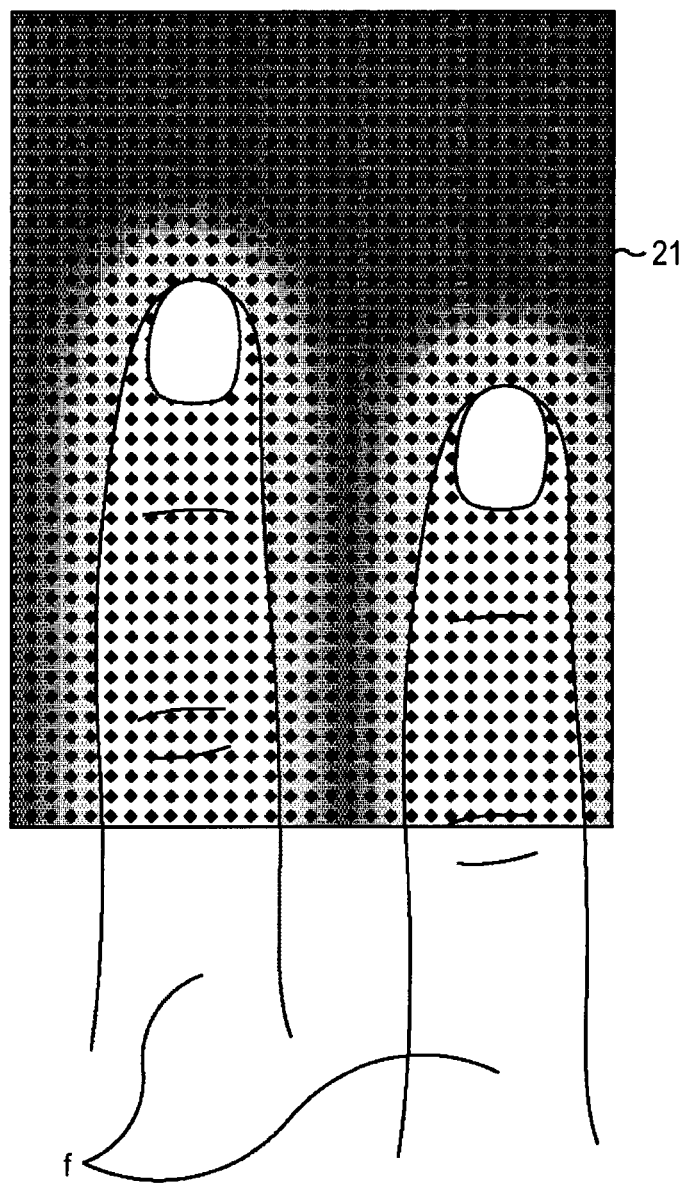
FIG. 3 is a diagram illustrating a detection technique used by an electro-static touch panel.

FIG. 3 is a diagram illustrating a detection technique used by the electro-static touch panel 21.

The electrostatic touch sensor 21-S for a touch panel used in the electrostatic touch panel 21 is configured by a combination of electrostatic sensors that are disposed in a matrix shape (for example 10×7) in the display unit 21-D. The electrostatic sensor has an electrostatic capacitance value changing constantly in accordance with a change in the electrostatic capacitance. Accordingly, in a case where a contact object such as a finger f is in proximity to or in contact with the electrostatic sensor, the electrostatic capacitance value of the electrostatic sensor increases. The CPU 22, to be described later, constantly monitors the electrostatic capacitance values of the electrostatic sensors. When the change in the amount of increase exceeds a threshold value, the CPU 22 determines that there is a "contact" of the finger f or the like that is in proximity to or in contact with the electrostatic touch panel 21. In other words, the CPU 22 detects the coordinates of the contact position of the finger f or the like based on the disposed position of the electrostatic sensor in which existence of the "contact" is determined. In other words, the CPU 22 can simultaneously monitor the electrostatic capacitance values of all the electrostatic sensors constituting the electrostatic touch sensor 21-S for a touch panel. The CPU 22 simultaneously monitors changes in the electrostatic capacitance values of all the electrostatic sensors and performs interpolation, and thereby the position of the finger f or the like that is in proximity to or in contact with the electrostatic touch panel 21, the shape of the finger f or the like, the contact area of the finger f or the like, and the like can be detected by the CPU 22.

For example, in an example illustrated in FIG. 3, in the electrostatic touch panel 21, a black display area represents an area which a finger f is not in proximity to or in contact with and of which the electrostatic capacitance does not change. In addition, a white display area represents an area which a finger f is in proximity to or in contact with and of which the electrostatic capacitance increases. In such a case, the CPU 22 can recognize the coordinates of the white area as the position of the finger f, detect the shape of the white area as the shape of the finger f, and detect the area of the white area as the contact area of the finger f.

In description here, a contact includes not only a static contact (a contact only with a specific area) but also a dynamic contact (a contact made by a contact object such as a finger f moving while drawing a predetermined trajectory). For example, the finger f on the electrostatic touch panel 21 is also one form of the contact. Hereinafter, a contact includes not only a complete contact but also proximity.

In addition, the CPU 22 can recognize the trajectory of the finger f or the like on the electrostatic touch panel 21 by detecting the contact positions of the finger f or the like in a time series. In addition, the CPU 22 can perform a predetermined process (hereinafter, referred to as an interaction process) corresponding to an operation by detecting the operation corresponding to such a trajectory.

Until now, the detection technique used in the electrostatic touch panel 21 has been described.

Configuration Example of Mobile Terminal Apparatus

Figure 4:
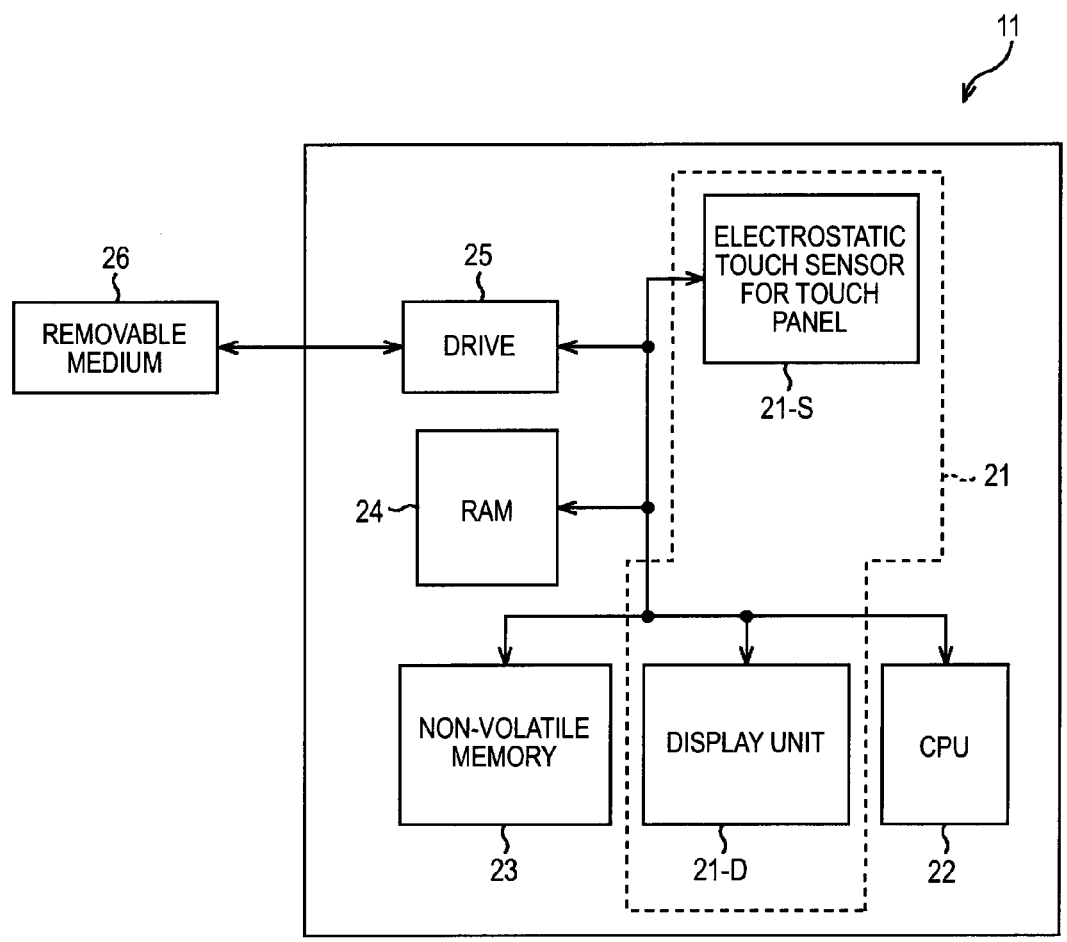
FIG. 4 is a block diagram showing an internal configuration example of the mobile terminal apparatus shown in FIG. 2.

FIG. 4 is a block diagram showing an internal configuration example of the mobile terminal apparatus 11 shown in FIG. 2.

The mobile terminal apparatus 11 is configured to include the CPU (Central Processing Unit) 22, a non-volatile memory 23, a RAM (Random Access Memory) 24, and a drive 25, in addition to the above-described electrostatic touch panel 21.

The electrostatic touch panel 21, as described above, is configured by the electrostatic touch sensor 21-S for a touch panel and the display unit 21-D.

The CPU 22 controls the overall operation of the mobile terminal apparatus 11. Accordingly, the electrostatic touch sensor 21-S for a touch panel, the display unit 21-D, the non-volatile memory 23, the RAM 24, and the drive 25 are connected to the CPU 22.

For example, the CPU 22 can perform a series of processes as follows. The CPU 22 generates a thread (hereinafter, referred to as an electrostatic capacitance monitoring thread) that monitors changes in the electrostatic capacitance of the electrostatic touch panel 21 at the time of start of a process or the like. Then, the CPU 22 determines whether the user's finger f is brought into contact with the electrostatic touch panel 21 based on the monitoring result of the electrostatic capacitance monitoring thread. Then, the CPU 22 detects the contact area of the finger f in a case where the user's finger f is determined to be brought into contact with the electrostatic touch panel 21. The CPU 22 calculates a ratio (area ratio) of the area of the objects displayed on the electrostatic touch panel 21 to the contact area of the finger f and changes the operation mode in accordance with the area ratio. After the operation mode is changed, the CPU 22 performs an interaction process corresponding to an operation in a case where the operation is performed in accordance with the operation mode. Hereinafter, such a series of the processes is referred to as an operation mode-compliant interaction process. A concrete example of the operation mode and a detailed example of the operation mode-compliant interaction process will be described later.

The non-volatile memory 23 stores various types of information. For example, even when the state of power transits to the OFF state, information to be stored and the like are stored in the non-volatile memory 23.

The RAM 24 temporarily stores programs and data that may be needed as a work area at the time when the CPU 22 performs various processes.

The drive 25 drives a removable medium 26 such as a magnetic disk, an optical disc, a magneto-optical disk, or a semiconductor memory.

Operation Mode of Mobile Terminal Apparatus

The mobile terminal apparatus 11 having the above-described configuration can automatically switch, for example, between two operation modes as below based on the ratio (area ratio) of the area of the object to the contact area of the finger f.

In any one of the two operation modes, a trace operation is a user's basic operation. The trace operation represents an operation of bringing a contact object (a finger f or the like) into contact with a predetermined area and then moving (dragging) the contact object (the finger f or the like) by a specific distance in a specific direction with a specific area used as a starting point, with the contact of the contact object (the finger f or the like) being maintained.

However, when the trace operation is performed on the electrostatic touch panel 21, the meaning (content of a direction) of the operation is different in accordance with the operation mode.

In other words, in one of the two operation modes, an interaction process of "moving an object brought into contact with the finger f along the trajectory of the finger f in accordance with the trace operation" may be assigned to the trace operation. In other words, the trace operation in such an operation mode is the same as that on a general touch panel to a user and corresponds to an operation of directly moving the object by using the finger f. Thus, hereinafter, such a trace operation is referred to as a direct movement operation. In addition, hereinafter, such an operation mode, that is, the operation mode in which the trace operation is recognized as the direct movement operation is referred to as a direct movement mode.

On the other hand, in the other of the two operation modes, an interaction process of "moving one or more objects (an object that is brought into contact with the finger f and objects positioned on the periphery thereof) so as to be collected along the trajectory of the finger f according to the trace operation may be assigned to the trace operation. The trace operation in such an operation mode corresponds to an operation of collecting a plurality of objects by using a user's finger. Thus, hereinafter, such a trace operation is referred to as a collection operation. In addition, hereinafter, such an operation mode, that is, an operation mode in which the trace operation is recognized as the collection operation is referred to as a collection movement mode.

By appropriately switching between the direct movement mode and the collection movement mode in accordance with the ratio (area ratio) of the area of the object to the contact area of the finger f, a seamless object operation can be performed.

Figure 5A:
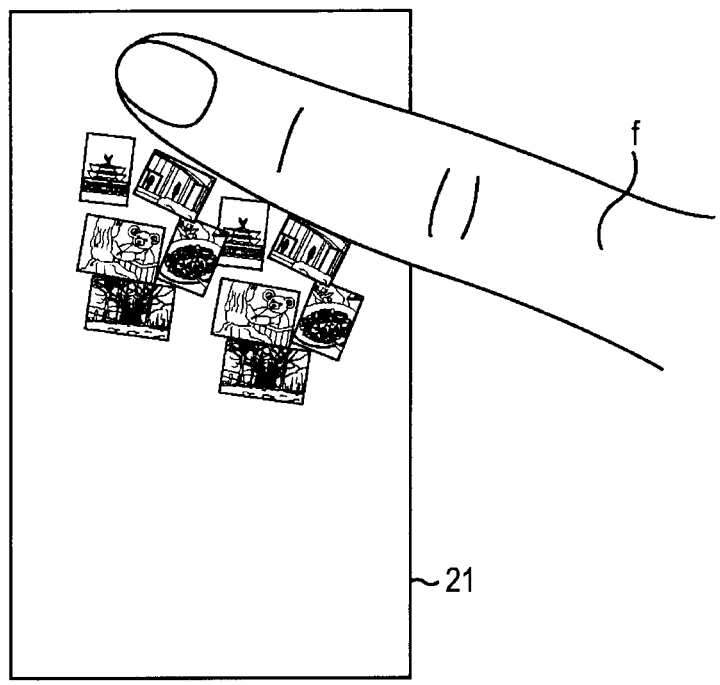
FIGS. 5A and 5B are diagrams illustrating a direct movement mode and a collection movement mode of the mobile terminal apparatus shown in FIG. 2 as operation modes.
Figure 5B:
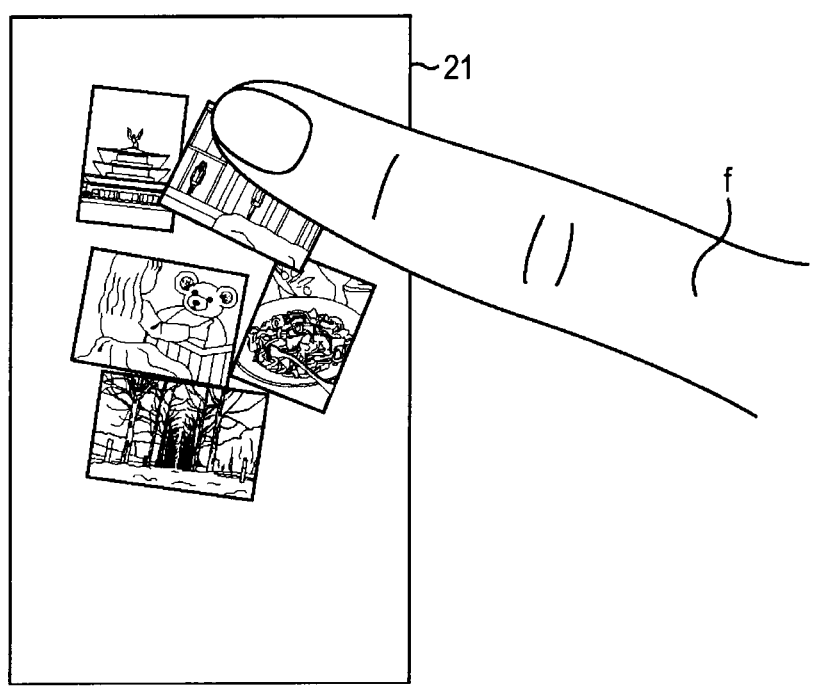

FIGS. 5A and 5B are diagrams illustrating the direct movement mode and the collection movement mode.

Within the electrostatic touch panel 21 shown in FIGS. 5A and 5B, each of rectangles in which various images are drawn represents one object.

For example, in the following example, the switching from one of the direct movement mode and the collection movement mode to the other is automatically performed based on the ratio of an average value of areas of the objects displayed on the electrostatic touch panel 21 or a processed value thereof to the contact area of the finger f on the electrostatic touch panel 21. Here, "automatically performing" represents that the mobile terminal apparatus 11 performs a process based on its determination (for example, a determination according to a predetermined program) without intervention of a user's explicit direction.

In a case where the size of the object is significantly smaller than the contact area of the finger f, that is, as shown in FIG. 5A, in a state in which it is difficult to operate one arbitrary object by using a finger f, switching to the collection movement mode can be performed.

On the other hand, in a case where the size of the object is equivalent to or larger than the contact area of the finger f, that is, as shown in FIG. 5B, in a state in which one arbitrary object can be easily operated by the finger f, switching to the direct movement mode can be performed.

As shown in FIGS. 5A and 5B, the sizes of the objects may not be the same to be different from one another even in a case where the objects are displayed at the same zoom ratio. Thus, the size of the object to be compared with the contact area of the finger f may need to be determined in the determining of switching between the operation modes. Hereinafter, such a size of the object is referred to as a mode determination size. A technique for determining the mode determination size is not particularly limited. For example, in this embodiment, as described above, a technique of determining the size on the basis of an average value of the areas of the objects displayed on the electrostatic touch panel 21 as the mode determination size is employed. Here, the size on the basis of the average value has a broad concept including not only the average value but also the size processed based on the average value.

In particular, for example, in this embodiment, in a case where the ratio (area ratio) of the mode determination size to the contact area of the finger f on the electrostatic touch panel 21 is equal to or greater than a predetermined value, the switching to the direct movement mode can be configured to be performed. For example, in a case where the area ratio (=mode determination size/contact area) is equal or greater than one, the switching to the direct movement mode can be configured to be performed. In other words, in a case where the contact area of the finger f is smaller than the mode determination size (the average size of the objects), the switching to the direct movement mode can be configured to be performed.

On the other hand, in a case where the area ratio is smaller than the predetermined value, the switching to the collection movement mode can be configured to be performed. For example, in a case where the area ratio is smaller than one, the switching to the collection movement mode can be configured to be performed. In other words, in a case where the contact area of the finger f is equal to or greater than the mode determination size (the average size of the objects), the switching to the collection movement mode can be configured to be performed.

Here, an example of the interaction process of the CPU 22 in the collection movement mode shown in FIG. 5A will be described.

In order to display collection of objects according to the finger f in a simulated manner, the CPU 22 uses a physical engine. The physical engine indicates a software library used for calculation of physical collision. As a representative physical engine, there is Box2D (trademark). For example, in this embodiment, a physical engine that is dedicated to a two-dimensional space is used.

In such a case, the CPU 22 monitors changes in the electrostatic capacitance values of the electrostatic sensors constituting the electrostatic touch sensor 21-S for a touch panel.

The CPU 22 generates physical objects for the electrostatic sensors having the change in the electrostatic capacitance equal to or greater than the threshold value by using the physical engine and disposes the physical objects in positions of the physical world corresponding to the disposed positions on the electrostatic touch panel 21. Here, the electrostatic sensor having the change in the electrostatic capacitance equal to or greater than the threshold value represents an electrostatic sensor from which a contact is detected. Accordingly, the CPU 22 can dispose a physical object simulating the finger f in the space (two-dimensional area) of the physical world corresponding to the area of the electrostatic touch panel 21 that is brought into contact with the finger f by using the physical engine so as to be recognized. Hereinafter, the object simulating the finger f is referred to as a finger object.

In addition, the CPU 22, by using the physical engine, defines each object (display object) displayed in the display unit 21-D configuring the electrostatic touch panel 21 as a physical object of each shape. Then, the CPU 22 disposes each physical object simulating each display object in the position of the physical world corresponding to each disposed position on the electrostatic touch panel 21 by using the physical engine. Hereinafter, a physical object simulating an object (display object) displayed in the display unit 21-D will be referred to as a display target object.

As described above, the CPU 22 can represent the contact state by using the physical object for each electrostatic sensor in real time by using the physical engine.

When the collection operation is performed by using the finger f in such a state, the finger object moves along the trajectory of the movement of the finger f in the physical world. In a case where the finger object collides with a display target object in the middle of its movement, the following phenomenon occurs in the physical world. The display target object that has collided with the finger object is flipped based on a physical law (the law of collision using a restitution coefficient to be described later) applied to the physical world. In addition, in a case where the flipped display target object collides with another display target object, the display target objects are flipped with each other.

The CPU 22 moves the object (display object) displayed in the display unit 21-D by reflecting the phenomenon within the physical world.

As a result, in the user's viewpoint, a state can be visually recognized in which the object (display object) displayed within the electrostatic touch panel 21 collides with the finger f and is flipped in a natural direction by performing a collection operation on the electrostatic touch panel 21.

Relationship Between Contact Time and Restitution Coefficient

In the physical world formed by the physical engine, an arbitrary physical law that is different from the physical laws of the natural world can be applied. However, in order to allow the user to have actual feeling of natural performance of a collection operation, it is very preferable to determine the restitution coefficient as follows. In other words, it is very preferable to reflect a time interval (hereinafter, referred to as a contact time) until the contact area of the finger f reaches the mode determination size after the finger f is brought into contact with the electrostatic touch panel 21 into the restitution coefficient. Hereinafter, the relationship between the contact time and the restitution coefficient will be described with reference to FIGS. 6A, 6B, and 7.

Figure 6A:
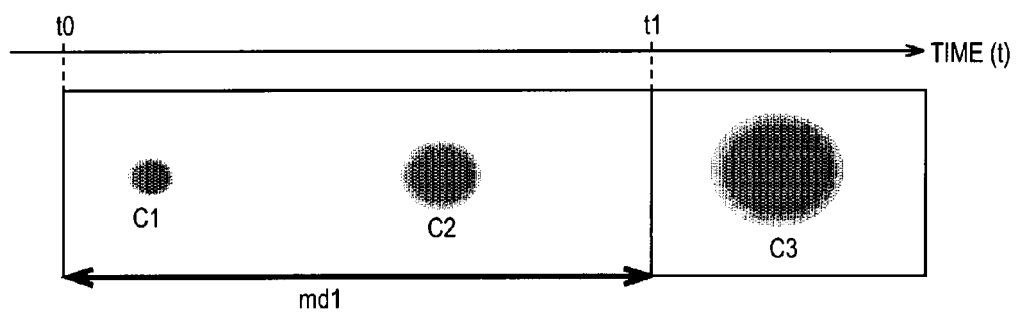
FIGS. 6A and 6B are diagrams representing a temporal change in a contact area of a finger.
Figure 6B:
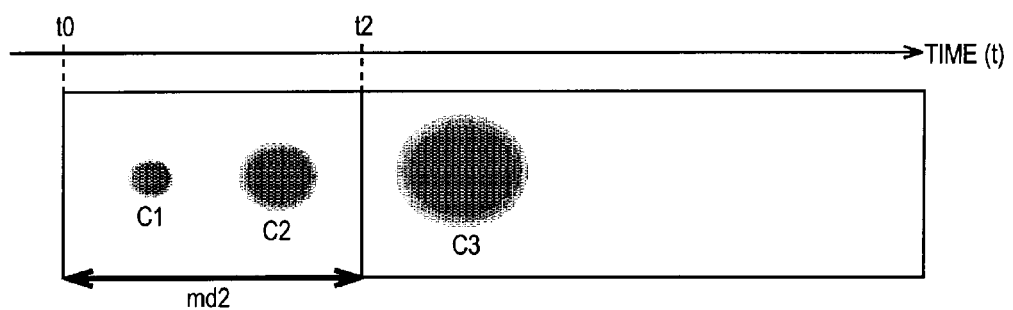

FIGS. 6A and 6B are diagrams representing a temporal change in the contact area of the finger f.

Hereinafter, a speed at which the finger f is brought into contact with the electrostatic touch panel 21 is referred to as a contact speed.

FIG. 6A represents a temporal change in the contact area of the finger f in a case where the contact speed is low. On the other hand, FIG. 6B represents a temporal change in the contact area of the finger f in a case where the contact speed is high.

In FIGS. 6A and 6B, the horizontal axis represents a time axis. Here, each of areas C1 to C3 represents a contact area of the finger f at specific time t. In other words, the areas of the areas C1 to C3 represent the contact areas of the finger f. It is assumed that the time elapses in the order of areas C1 to C3.

In FIGS. 6A and 6B, it is assumed that the time at which the contact of the finger f is started is time t0. In addition, it is assumed that the time at which the contact area of the finger f coincides with the mode determination size is time t1 for the case of FIG. 6A and time t2 for the case of FIG. 6B.

Hereinafter, it is assumed that the switching to the collection movement mode can be performed in a case where the ratio (area ratio=mode determination size/contact area) of the mode determination size to the contact area of the finger f with the electrostatic touch panel 21 is smaller than one. In other words, in such a case, the switching to the direct movement mode can be performed in a case where the contact area of the finger f is equal to or smaller than the mode determination size. On the other hand, the switching to the collection movement mode can be performed in a case where the contact area of the finger f is greater than the mode determination size.

In other words, in FIG. 6A, during a time interval md1 from the time t0 to the time t1, the operation mode of the mobile terminal apparatus 11 is the direct movement mode. In other words, the time interval md1 is the contact time. At the time t1 when the contact time md1 elapses after start of the contact, the contact area of the finger f coincides with the mode determination size. Accordingly, the operation mode of the mobile terminal apparatus 11 is changed from the direct movement mode to the collection movement mode. Thereafter, the operation mode of the mobile terminal apparatus 11 becomes the collection movement mode.

On the other hand, in FIG. 6B, during a time interval md2 from the time t0 to the time t2, the operation mode of the mobile terminal apparatus 11 is the direct movement mode. In other words, the time interval md2 is the contact time. At the time t2 when the contact time md2 elapses after start of the contact, the contact area of the finger f coincides with the mode determination size. Accordingly, the operation mode of the mobile terminal apparatus 11 is changed from the direct movement mode to the collection movement mode. Thereafter, the operation mode of the mobile terminal apparatus 11 becomes the collection movement mode.

By comparing FIGS. 6A and 6B with each other, it can be noticed that the contact time md1 represented in FIG. 6A for the case of the low contact speed is longer than the contact time md2 represented in FIG. 6B for the case of the high contact speed. In other words, it can be noticed that the contact time changes in accordance with the contact speed.

Here, in the user's viewpoint, the case where the contact speed is high corresponds to a case where the finger f is brought into contact with the electrostatic touch panel 21 vigorously (quickly). In such a case, the user feels it natural that the object (display object) displayed on the electrostatic touch panel 21 vigorously moves (represented as such) backward when colliding with the finger f. In other words, in a case where the contact speed is high, it is very preferable that the restitution coefficient in the physical engine is high.

On the other hand, for the user, the case where the contact speed is low corresponds to a case where the finger f is brought into contact with the electrostatic touch panel 21 gently (slowly). In such a case, the user feels it natural that the object (display object) displayed on the electrostatic touch panel 21 does not move (represented as such) back much when colliding with the finger f. In other words, in a case where the contact speed is low, it is very preferable that the restitution coefficient in the physical engine is low.

Figure 7:
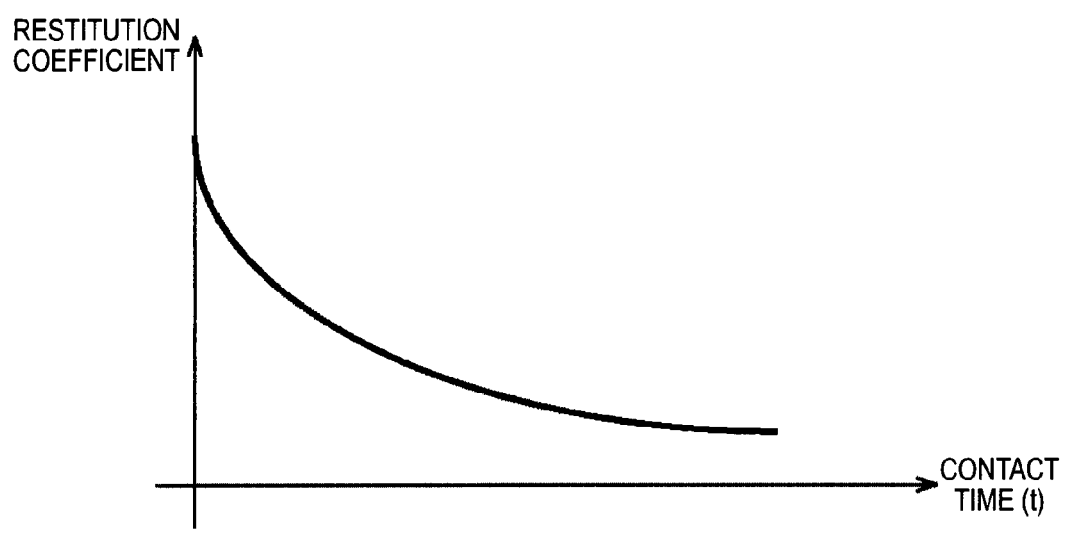
FIG. 7 is a diagram illustrating the relationship between a contact time and a restitution coefficient.

Thus, as the physical law applied in the physical engine, for example, it is very preferable that a law represented in FIG. 7 is applied.

FIG. 7 is a diagram illustrating the relationship between the contact time and the restitution coefficient.

In FIG. 7, the horizontal axis represents the contact time, and the vertical time represents the restitution coefficient. In the example represented in FIG. 7, it can be noticed that as the contact time is shortened, the restitution coefficient increases. Here, shortening of the contact time indicates an increase in the movement speed. Thus, in other words, it can be noticed that the restitution coefficient increases as the movement speed becomes higher.

By allowing the graph (the data thereof) represented in FIG. 7 to be stored in the RAM 24 represented in FIG. 4 or the like, the CPU 22 can calculate a restitution coefficient corresponding to a contact time by measuring the contact time. Then, the CPU 22, in the middle of performing the interaction process in the collection movement mode, can use the calculated restitution coefficient for physical calculation performed by the physical engine. As a result, for the user, the collection operation can be performed as a natural operation as in the case where an object is collected in the real world.

In addition, in a case where a vibration sensor is included as a constituent element of the mobile terminal apparatus 11, a vibration caused by the contact with the electrostatic touch panel 21 can be detected. In such a case, the CPU 22 can additionally reflect the amount of vibration detected by the vibration sensor into the restitution coefficient. For example, the CPU 22 can set the restitution coefficient to be increased as the amount of vibration increases.

Operation Mode-Compliant Process

Next, as an example of the process of the mobile terminal apparatus 11, the operation mode-compliant interaction process will be described in detail.

FIG. 8 is a flowchart illustrating an example of the operation mode-compliant interaction process.

In Step S11, the CPU 22 acquires the electrostatic capacitance of the electrostatic touch panel 21 and performs interpolation for the electrostatic capacitance with arbitrary resolution. In other words, at the start time point of the operation mode-compliant interaction process, the CPU 22 generates an electrostatic capacitance monitoring thread, as described above. The CPU 22 acquires the electrostatic capacitance of the electrostatic touch panel 21 through the electrostatic capacitance monitoring thread, calculates a difference between the acquired electrostatic capacitance and electrostatic capacitance at the time of generation of the thread, and performs interpolation with arbitrary resolution.

In Step S12, the CPU 22 determines whether or not the contact area of the finger f with the electrostatic touch panel

21 is equal to or greater than a threshold value (for example, 30% of the area of the electrostatic touch panel 21).

When the contact area is smaller than the threshold value, it can be assumed that there is no contact of the finger f with the electrostatic touch panel 21. Accordingly, "NO" is determined in Step S12, and the process is returned back to Step S11. Then, processes thereafter are repeated.

Thereafter, when the user brings the finger f into contact with the electrostatic touch panel 21, the contact area is equal to or greater than the threshold value at a time point. At the time point, "YES" is determined in Step S12, and the process proceeds to Step S13.

In Step S13, the CPU 22 determines whether the contact is a newly detected contact.

When the contact with the electrostatic touch panel 21 is not a newly detected contact, that is, a contact in the middle of the operation, "NO" is determined in Step S13, and the process is returned back to Step S11. Then, processes thereafter are repeated.

On the other hand, when the contact with the electrostatic touch panel 21 is a newly detected contact, "YES" is determined in Step S13, and the process proceeds to Step S14.

In Step S14, the CPU 22 starts to measure the contact time. In other words, time when the contact with the electrostatic touch panel 21 is determined to be a newly detected contact in the process of Step S13 is set as reference time. The CPU 22 starts the time measurement operation from the reference time and continues the time measurement operation until the contact area reaches the mode determination size (until the process of Step S21, to be described later, is performed).

In Step S15, the CPU 22 discretizes the electrostatic capacitance and converts pixels having electrostatic capacitance values equal to or greater than the threshold value into physical objects on the screen. In other words, the CPU 22 generates finger objects and disposes the finger objects in the space (two-dimensional area) of the physical world inside the physical engine.

In Step S16, the CPU 22 calculates the average (the value or a processed value thereof) of the areas of the objects within an arbitrary area on the screen (the display unit 21-D) of the electrostatic touch panel 21 as the mode determination size.

The method of calculating the mode determination size is not particularly limited. For example, a technique of calculating an arithmetic average or a geometric mean of the areas of the objects placed in the entire screen area of the electrostatic touch panel 21 or an area located near the finger f or the like may be employed. In addition, as described above, the average value of the areas of the objects may be used as the mode determination size. Alternatively, a processed size of the average value of the areas of the objects may be used as the mode determination size. In particular, for example, the size corresponding to an arbitrary ratio (average of the areas×α %) of the average of the areas of the objects may be used as the mode determination size.

In Step S17, the CPU 22 determines whether the contact area is equal to or greater than the mode determination size.

In a case where the contact area is equal to or greater than the mode determination size, "YES" is determined in Step S17, and the process proceeds to Step S21. In other words, the operation mode of the mobile terminal apparatus 11 is switched to the collection movement mode, and the interaction process corresponding to the collection movement operation as the process of Step S21 and thereafter is performed. The process of Step S21 and thereafter will be described later.

On the other hand, in a case where the contact area is smaller than the mode determination size, "NO" is determined in Step S17, and the process proceeds to Step S18. In other words, the operation mode of the mobile terminal apparatus 11 is switched to the direct movement mode, and the interaction process corresponding to the direct movement operation as the process of Step S18 and thereafter is performed.

In Step S18, the CPU 22 determines whether the finger f is brought into contact with an object.

In a case where the finger f is not brought into contact with an object, "NO" is determined in Step S18, and the process is returned back to Step S11. Then, the process thereafter is repeated.

On the other hand, in a case where the finger f is brought into contact with an object, "YES" is determined in Step S18, and the process proceeds to Step S19.

In Step S19, the CPU 22 moves the contacted object in accordance with the movement of the finger f. In other words, in the viewpoint of the user, during this period, the direct movement operation is performed. Thus, the CPU 22 performs an interaction process corresponding to the direct movement operation. Accordingly, the process proceeds to Step S20. The process of Step S20 and thereafter will be described later.

In contrast to the above-described process for the case of the direct movement mode, the process for the case of the collection movement mode is as follows.

In Step S17, in a case where the contact area is equal to or greater than the mode determination size, the process proceeds to Step S21.

In Step S21, the CPU 22 completes the measurement of the contact time.

In Step S22, the CPU 22 reflects the contact time in the restitution coefficient. In other words, the contact time that is measured in Step S21 is reflected in the restitution coefficient (see FIG. 7).

In Step S23, the CPU 22 moves the object based on physical calculation (performs display control as such). In other words, in the user's viewpoint, during this period, the collection operation is performed. Accordingly, the CPU 22 performs an interaction process corresponding to the collection operation. Accordingly, the process proceeds to Step S20.

In Step S20, the CPU 22 determines whether completion of the process has been directed.

In a case where the completion of the process has not been directed, "NO" is determined in Step S20, and the process is returned back to Step S11. Then, the process thereafter is repeated. In other words, until the completion of the process is directed, a looping process of Steps S11 to S20 is repeated.

Thereafter, in a case where the completion of the process has been directed, "YES" is determined in Step S20, and the operation mode-compliant interaction process is completed.

Concrete Example of Automatic Switching of Operation Modes

In the above-described example, as a switching condition (hereinafter, referred to as a mode switching condition) of the operation modes (the collection movement mode and the direct movement mode), the condition that the contact area of the finger f and the mode determination size are the same is employed.

As situations satisfying the mode switching condition, various situations may be considered. Hereinafter, for each case where the mode switching condition is satisfied in accordance with several different situations, a concrete example of automatic switching of the operation mode performed by the mobile terminal apparatus 11 will be described.

FIGS. 9A, 9B, 10A, 10B, 11A, 11B, 12A, and 12B are diagrams illustrating concrete examples of automatic switching of the operation modes that is performed by the mobile terminal apparatus 11.

Also in FIGS. 9A to 12B, similarly to FIGS. 5A and 5B, each of rectangles in which various images are drawn represents one object. In addition, a dark area (including an area hidden by the finger f in FIGS. 9A to 11B) represents the contact area of the finger f.

Figure 9A:
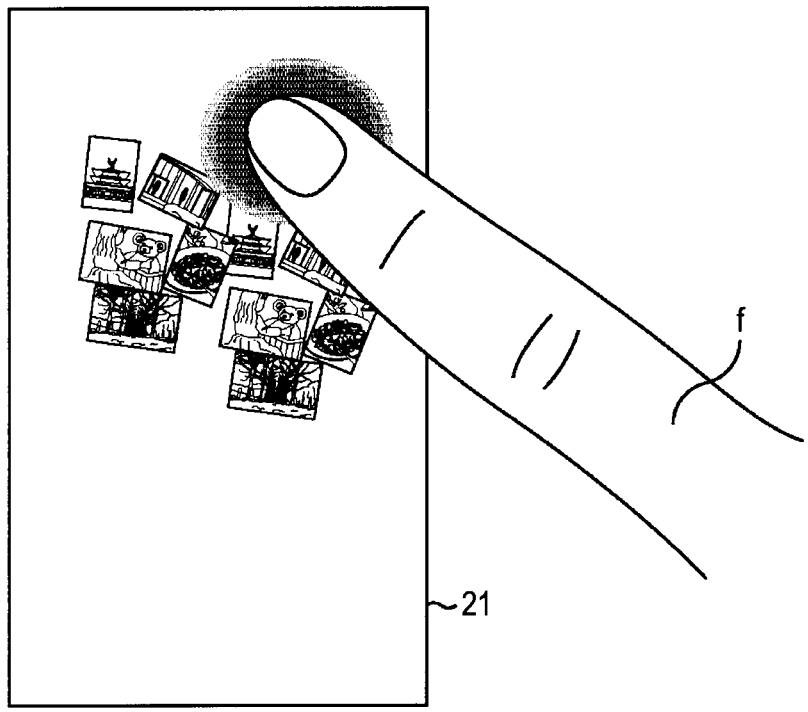
FIGS. 9A and 9B are diagrams illustrating a concrete example of automatic switching of operation modes of the mobile terminal apparatus shown in FIG. 2.
Figure 9B:
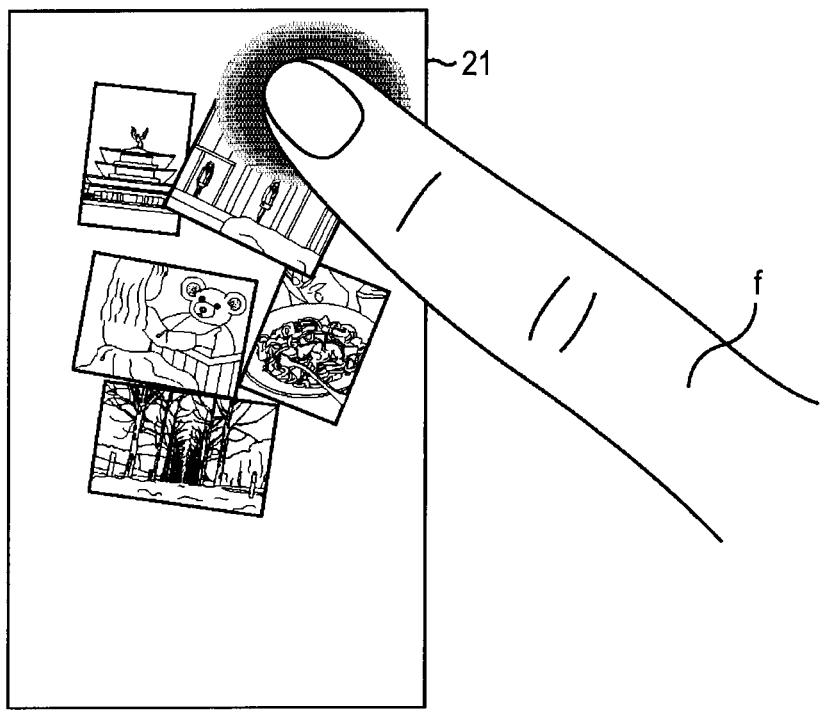

FIGS. 9A and 9B are diagrams illustrating a concrete example of automatic switching of the operation modes performed by the mobile terminal apparatus 11 in a case where the mode switching condition is satisfied in accordance with a change in the zoom ratio of display.

It is assumed that the zoom ratio of display is 30% for the case of FIG. 9A, and the zoom ratio of display is 100% for the case of FIG. 9B. In such cases, the contact area of the finger f does not change in any of FIGS. 9A and 9B. However, in FIGS. 9A and 9B, the sizes of objects are different from each other in accordance with the zoom ratio of display. In other words, when the size of the object represented in FIG. 9B is 100%, the size of the object on the electrostatic touch panel 21 shown in FIG. 9A is reduced to be 30%.

Thus, in the state shown in FIG. 9A, the size of the object is significantly smaller than the contact area of the finger f. As a result, in the state shown in FIG. 9A, the contact area of the finger f is equal to or greater than the mode determination size, and accordingly, the operation mode of the mobile terminal apparatus 11 is automatically switched to the collection movement mode. On the other hand, in the state shown in FIG. 9B, the size of the object is equivalent to or larger than the contact area of the finger f. As a result, in the state shown in FIG. 9B, the operation mode of the mobile terminal apparatus 11 can be switched to the direct movement mode.

As described above, even in a case where the user brings the finger f into contact with the object in the same manner, when the zoom ratio of display is changed, the operation mode of the mobile terminal apparatus 11 is automatically switched, and thereby a different interaction process is performed.

Figure 10A:
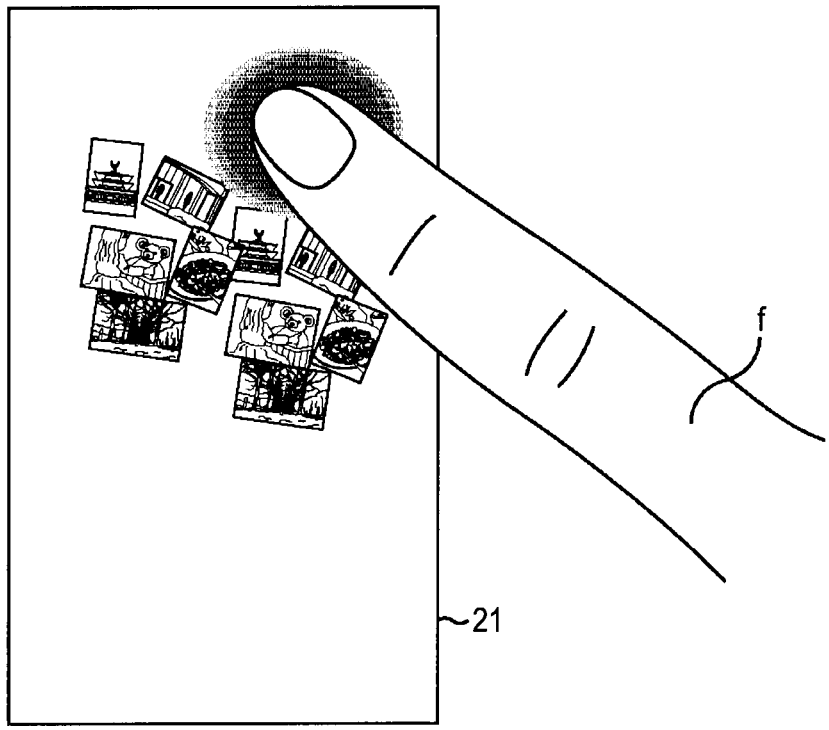
FIGS. 10A and 10B are diagrams illustrating a concrete example of automatic switching of operation modes of the mobile terminal apparatus shown in FIG. 2.
Figure 10B:
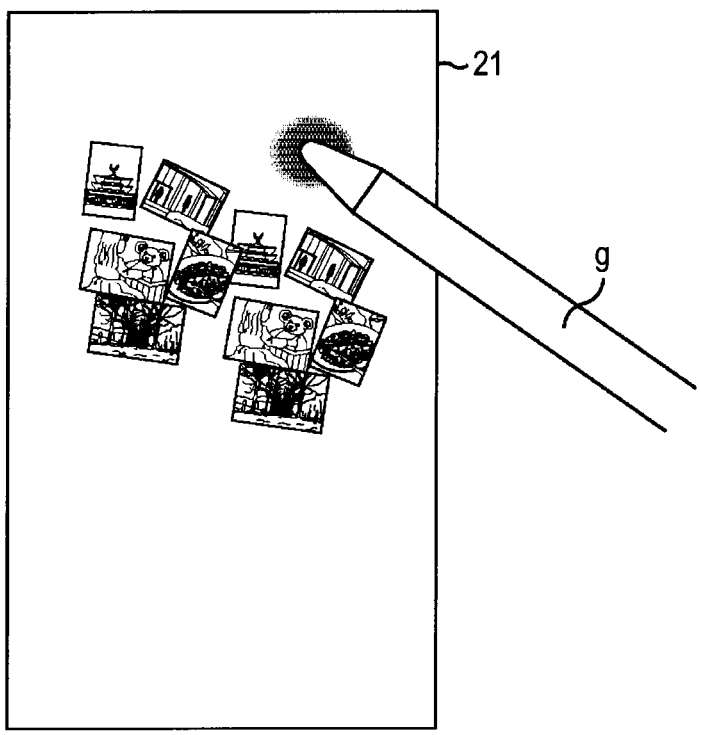

FIGS. 10A and 10B are diagrams illustrating a concrete example of automatic switching of the operation mode of the mobile terminal apparatus 11 for a case where the mode switching condition is satisfied in accordance with a change in the contact area of the contact object.

In both cases of FIGS. 10A and 10B, the zoom ratio is the same, and the size of the object is not changed. However, while a finger f as an example of a contact object is brought into contact with the electrostatic touch panel 21 in FIG. 10A, a pen g as another example of the contact object is brought into contact with the electrostatic touch panel 21 in FIG. 10B. In other words, the contact area of FIG. 10A is greater than that of FIG. 10B.

Accordingly, in the state of FIG. 10A, the size of the object is significantly smaller than the contact area of the finger f. As a result, in the state of FIG. 10A, the contact area of the finger f is equal to or greater than the mode determination size. Accordingly, the operation mode of the mobile terminal apparatus 11 is automatically switched to the collection movement mode. On the other hand, in the state of FIG. 10B, the size of the object is equivalent to or greater than the contact area of the pen g. As a result, in the state of FIG. 10B, the operation mode of the mobile terminal apparatus 11 can be switched to the direct movement mode.

As described above, even in a case where the sizes of the objects are the same (for example, the zoom ratio of display is constant), when the contact area of the contact object is changed, the operation mode of the mobile terminal apparatus 11 is automatically switched, and a different interaction process is performed. As a result, for example, similarly to the example shown in FIGS. 10A and 10B, the usage can be differentiated by moving an object to be collected by using the finger f and directly moving an object by using the pen g.

Figure 11A:
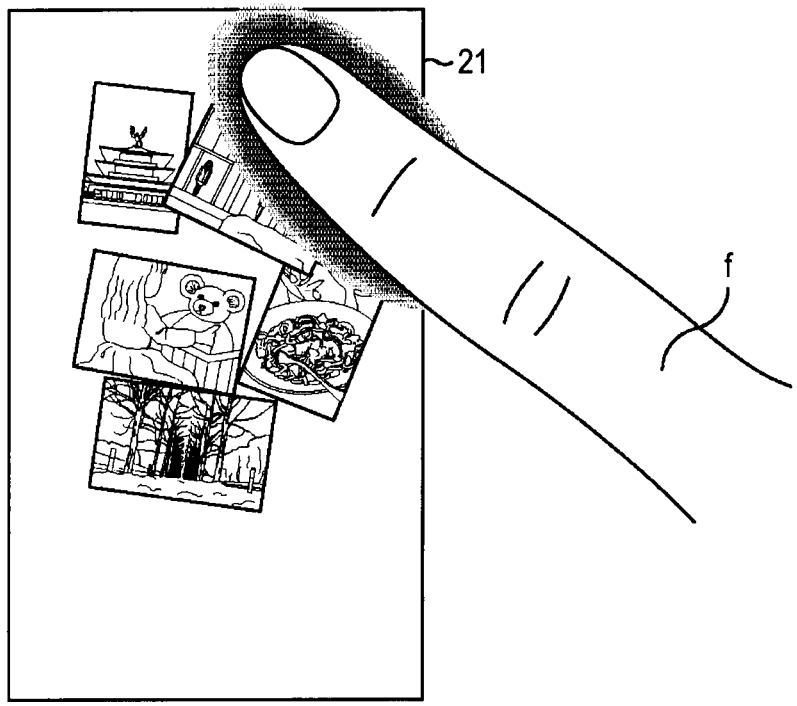
FIGS. 11A and 11B are diagrams illustrating a concrete example of automatic switching of operation modes of the mobile terminal apparatus shown in FIG. 2.
Figure 11B:
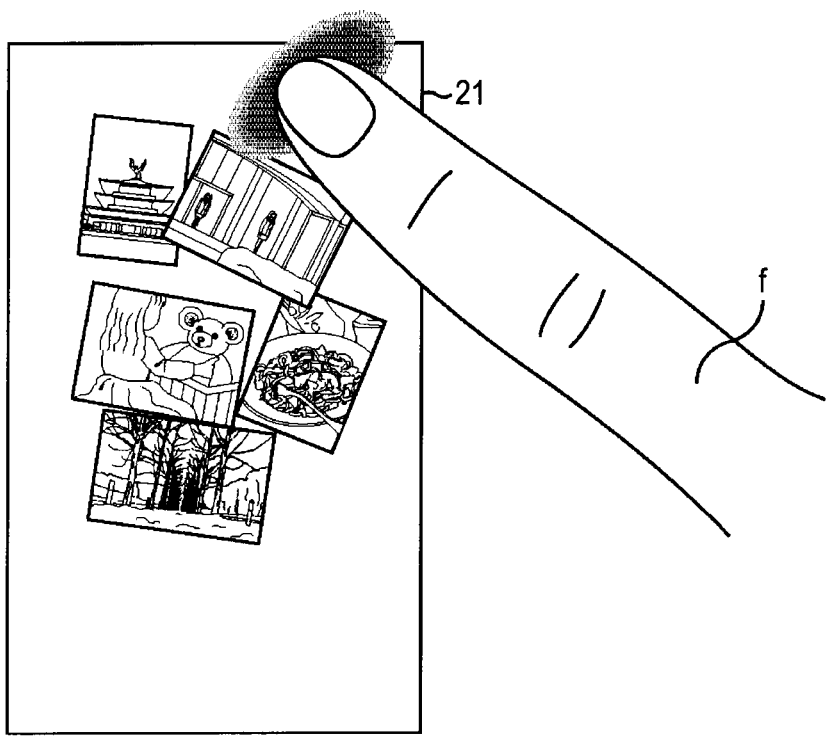

FIGS. 11A and 11B are diagrams illustrating a concrete example of automatic switching of the operation mode of the mobile terminal apparatus 11 for a case where the mode switching condition is satisfied in accordance with a change in the contact area of the finger f.

In both cases of FIGS. 11A and 11B, the zoom ratio is the same, and the size of the object is not changed. However, while the flat portion of the finger f is brought into contact with the electrostatic touch panel 21 in FIG. 11A, the tip of the finger f is brought into contact with the electrostatic touch panel 21 in FIG. 11B. In other words, the contact area of FIG. 11A is greater than that of FIG. 11B.

Accordingly, in the state of FIG. 11A, the size of the object is significantly smaller than the contact area of the flat portion of the finger f. As a result, in the state of FIG. 11A, the contact area of the finger f is equal to or greater than the mode determination size, and the operation mode of the mobile terminal apparatus 11 is automatically switched to the collection movement mode. On the other hand, in the state of FIG. 11B, the size of the object is equivalent to or greater than the contact area of the tip of the finger f. As a result, in the state of FIG. 11B, the operation mode of the mobile terminal apparatus 11 can be automatically switched to the direct movement mode.

As described above, even in a case where the sizes of the objects are the same (for example, the zoom ratio of display is constant), when the contact area of the finger f is changed, the operation mode of the mobile terminal apparatus 11 is automatically switched, and a different interaction process is performed. As a result, for example, similarly to the example of FIGS. 11A and 11B, the usage can be differentiated by moving an object to be collected by using the flat portion of the finger f (by vigorously pressing the finger f) and directly moving an object by using the tip of the finger f (by gently bringing the finger f into contact with the object).

Figure 12A:
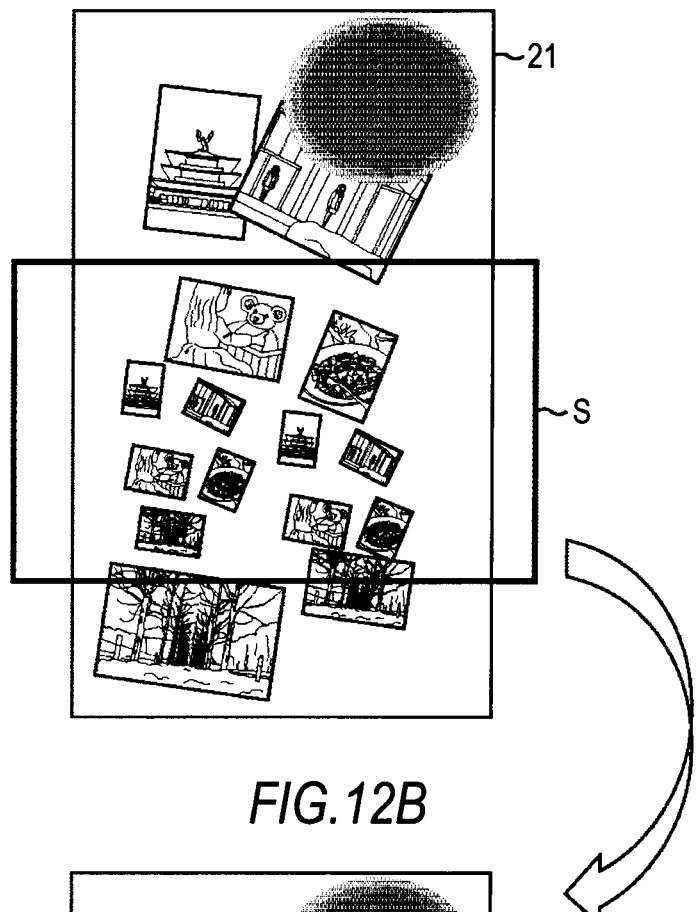
FIGS. 12A and 12B are diagrams illustrating a concrete example of automatic switching of operation modes of the mobile terminal apparatus shown in FIG. 2.
Figure 12B:
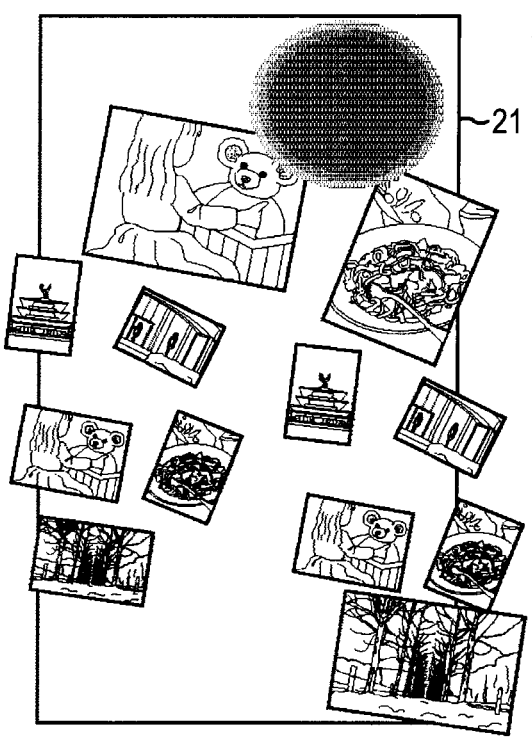

FIGS. 12A and 12B represent a case where the sizes of the objects are different from one another in accordance with user's preference or the like, and are diagrams illustrating a concrete example of automatic switching of the operation mode of the mobile terminal apparatus 11 for the case where the mode switching condition is satisfied in accordance with a change in the zoom ratio of display.

It is assumed that the zoom ratio of display for the case of FIG. 12A is 50%, and the zoom ratio of display of FIG. 12B is 100%.

In addition, in this example, it is assumed that the mode determination size is calculated based on the average of the areas of not the objects placed on the entire screen of the electrostatic touch panel 21 but the objects placed in a small area around the contact area of the finger f.

As shown in FIG. 12A, in this example, even when the zoom ratio of display is the same (50% in the example of FIG. 12A), the sizes of the objects displayed on the electrostatic touch panel 21 are different from one another in accordance with user's preference or the like. For example, an object that is preferred by the user or an object that is frequently operated corresponds to an object having high preference, and accordingly, the object is displayed in a large scale.

In such a case, when the contact area (black area) of the finger f is in the state of FIG. 12A, the mode determination size is calculated based on two large objects displayed on the upper side in the figure. Accordingly, when the contact area (black area) of the finger f is in the state of FIG. 12A, the operation mode of the mobile terminal apparatus 11 can be switched to the direct movement mode. Therefore, when the contact area (black area) of the finger f is in the state of FIG. 12A, the user can perform a direct movement operation. In other words, an object (an object that is disposed below the black area) placed in the contact area can be directly moved by using the finger f.

However, for example, in the display state of FIG. 12A, it is difficult for the user to perform a direct movement operation for an object that is placed within a frame S in the figure. The reason is that the size of the objects placed within the frame S is significantly smaller than the contact area of the finger f. In other words, in the display state of FIG. 12A, in a case where the contact area (not shown in the figure) of the finger f is located within the frame S, the contact area of the finger f is equal to or greater than the mode determination size, and thereby the operation mode of the mobile terminal apparatus 11 is automatically switched to the collection movement mode.

Thus, when it is desirable to perform a direct movement operation for a desired object located within the frame S, the user may display the desired object in an enlarged scale by increasing the zoom ratio of display. For example, the user may change the zoom ratio of display from 50% of the case of FIG. 12A to 100% of the case of FIG. 12B. Accordingly, the size of the objects positioned within the frame S becomes larger relative to the contact area of the finger f. As a result, the contact area of the finger f is smaller than the mode determination size, and thereby the operation mode of the mobile terminal apparatus 11 is automatically switched to the direct movement mode. Thus, in the state of FIG. 12B, the user can perform a direct movement operation even for an object that is positioned within the frame S in the state of FIG. 12A. In other words, in the state of FIG. 12B, the user can perform a direct movement operation even for an object (an object for which it is difficult to perform a direct movement operation) that is positioned within the frame S in the state of FIG. 12A by using the finger f.

As described above, by changing the zoom ratio of display, the number of objects for which the direct movement operation can be performed can be changed. In other words, as the zoom ratio of display is increased, the number of objects for which a direct movement operation can be performed can be increased. In other words, in a case where objects for which a direct movement operation is to be performed out of all the objects are selected (filtered), the degree of filtering can be changed by changing the zoom ratio. In other words, since the number of objects (objects than can be moved by being dragged) for which a direct movement operation can be performed is changed in accordance with the zoom ratio, a direct movement operation (movement by drag) can be selectively performed only for the filtered objects.

In FIGS. 9A to 12B, concrete examples of automatic switching of the operation mode that is performed by the mobile terminal apparatus 11 have been individually described. However, the automatic switching of the operation mode may be performed by combining arbitrary two or more of the above-described examples.

In the above-described examples, as the mode switching condition, the condition that the contact area of the finger f is the same as the mode determination size is employed. However, the mode switching condition is not limited thereto. Thus, an arbitrary condition may be employed as described above.

The above-described series of processes may be performed by hardware or software. In a case where the series of processes is performed by software, a program configuring the software is installed to a computer. Here, the computer includes a computer that is built in dedicated hardware and a computer that can perform various functions by installing various programs, for example, a general-purpose personal computer, and the like.

For example, the series of processes may be performed by a computer that controls the mobile terminal apparatus 11 shown in FIG. 4.

In FIG. 4, the CPU 22 performs the above-described series of processes by loading a program, for example, stored in the non-volatile memory 23 into the RAM 24 and executing the program.

The program executed by the CPU 22, for example, may be provided by being recorded on a removable medium 26 as a package medium or the like. In addition, the program may be provided through a wired or wireless transmission medium such as a local area network, the Internet, or a digital satellite broadcast.

The program can be installed to the non-volatile memory 23 by loading the removable medium 26 into the drive 25.

In addition, the program executed by the computer may be a program that performs processes in a time series in the described order, a program that performs the processes in parallel to one another, or a program that performs the processes at a necessary timing such as a timing at the time of being called.

The present application contains subject matter related to that disclosed in Japanese Priority Patent Application JP 2009-114195 filed in the Japan Patent Office on May 11, 2009, the entire contents of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing apparatus comprising display means for displaying an image including an object;
   detection means, which is stacked on the display means, for detecting a contact with the display means;
   control means for switching an operation mode of the display means based on a ratio of an area of the object displayed in the display means to an area of a region of the display means in which the contact is detected by the detection means; and
   wherein the object displayed on the display means can be directly operated by a user by performing upon a surface of the detection means a gesture operation of collecting the displayed object and moving the displayed object in accordance with the gesture operation and the operation mode selected by the control means.

2. The information processing apparatus according to claim 1,
   wherein an operation of moving a contact object by a predetermined distance in a predetermined direction with the contact object being brought into contact with the display means is a trace operation,
   wherein, as the operation modes, there are a first mode, in which the object brought into contact with a finger out of a plurality of objects displayed in the display means is moved along the trajectory of the finger according to the trace operation as a process for the trace operation, and a second mode, in which one or more of the plurality of objects displayed in the display means are moved to be collected along the trajectory of the finger according to the trace operation as a process for the trace operation, and wherein the control means switches the operation mode to the first mode in a case where the ratio is equal to or greater than a predetermined value, and switches the operation mode to the second mode in a case where the ratio is smaller than the predetermined value.

3. The information processing apparatus according to claim 2, wherein the control means also controls the performance of a process corresponding to the switched mode of the first mode and the second mode.

4. The information processing apparatus according to claim 3, wherein the control means controls the performance of the process by using a result calculated by a physical engine in a case where switching to the second mode is performed.

5. The information processing apparatus according to claim 1, wherein the control means calculates the ratio by using an average value of areas of a plurality of target objects or a processed value thereof as the area of the object in a case where there are the plurality of target objects to be operated out of objects displayed in the display means.

6. The information processing apparatus according to claim 1, wherein the control means switches the operation mode to a first mode when the ratio is equal to or greater than a predetermined value, and the control means switches the operation mode to a second operation mode when the ratio is smaller than the predetermined value.

7. The information processing apparatus according to claim 6, wherein in the first mode, a contact object providing the contact with the display means directly moves the displayed object by dragging after the contact object is brought into contact with the displayed object, and wherein in the first mode, the contact object flips objects located on the touch panel in a direction along a trajectory corresponding to a motion of the contact object after the contact object is brought into contact with the display means.

8. The information processing apparatus according to claim 6, wherein when the control means switches the operation mode to the first mode, the displayed object is moved in direct correspondence to a movement of a contact object providing the contact after the contact object is brought into contact with the displayed object and while the contact object remains in contact with the display means, and when the control means switches the operation mode to the second mode, objects displayed in the display means, which come into contact or in close proximity with the contact object while the contact object engages in a trace operation in which the contact object moves while remaining in contact with the display means, are collected to be positioned along a trajectory of the moving contact object.

9. The information processing apparatus according to claim 6, wherein when the control means switches the operation mode to the first mode, the displayed object is moved in direct correspondence to a movement of a contact object providing the contact after the contact object is brought into contact with the displayed object and while the contact object remains in contact with the display means, and when the control means switches the operation mode to the second mode, the contact object engages in a trace operation in which the contact object moves while remaining in contact with the display means, the contact object colliding with the displayed object while engaged in the trace operation, and the displayed object is moved from a point of impact based on a trajectory of the moving contact object at the point of impact.

10. The information processing apparatus according to claim 9, wherein a plurality of objects are included in the image displayed by the display means, and in the second mode, the contact object collides with the plurality of objects while engaged in the trace operation, and the plurality of objects move from respective points of impact based on the trajectory of the moving contact object at the respective points of impact, and the plurality of objects further collide with each other.

11. The information processing apparatus according to claim 9, wherein in the second mode, after colliding with the contact object, the displayed object is moved at a speed corresponding to a contact speed at which the contact object is brought into contact with the display means.

12. The information processing apparatus according to claim 9, wherein in the second mode, after colliding with the contact object, the displayed object is moved at a speed corresponding to a detected vibration caused by the contact object being brought into contact with the display means.

13. The information processing apparatus according to claim 1, wherein the ratio is a value of 1.

14. The information processing apparatus according to claim 1, wherein the area of the object displayed in the display means corresponds to a size of the displayed object, and the area of the region of the display means in which the contact is detected corresponds to a size of a contact object that contacts the display means.

15. An information processing method of an information processing apparatus that includes a display means for displaying an image including an object and a detection means, which is stacked on the display means, for detecting a contact with the display means, the method comprising the step of:

allowing the information processing apparatus to switch an operation mode of the display means based on a ratio of an area of the object displayed in the display means to an area of a region of the display means in which a contact is detected by the detection means, wherein the object displayed on the display means can be directly operated by a user by performing upon a surface of the detection means a gesture operation of collecting the displayed object and moving the displayed object in accordance with the gesture operation and the operation mode.

16. An information processing apparatus comprising:

a display unit configured to display an image including an object;

a detection unit, which is stacked on the display unit, and configured to detect a contact with the display unit; and a control unit configured to switch an operation mode of the display unit based on a ratio of an area of the object displayed in the display unit to an area of a region of the display unit in which the contact is detected by the detection unit, wherein the object displayed on the display unit can be directly operated by a user by performing upon a surface of the detection unit a gesture operation of collecting the displayed object and moving the displayed object in accordance with the gesture operation and the operation mode selected by the control unit.

* * * * *